United States Patent [19]

Yacono

[11] 4,007,708
[45] Feb. 15, 1977

[54] ANIMAL LITTER PRODUCT
[76] Inventor: Catherine L. Yacono, 44 W. 31st Place, Steger, Ill. 60475
[22] Filed: July 24, 1975
[21] Appl. No.: 599,008

Related U.S. Application Data

[63] Continuation of Ser. No. 478,039, June 10, 1974, abandoned.
[52] U.S. Cl. .................................. 119/1
[51] Int. Cl.$^2$ ............................ A01K 29/00
[58] Field of Search .................. 119/1; 260/345.5
[56] References Cited

UNITED STATES PATENTS

| 3,059,615 | 10/1962 | Kuceski | 119/1 |
| 3,122,565 | 2/1964 | Kijma et al. | 260/345.5 X |
| 3,212,901 | 10/1965 | Robeson | 260/34.5 X |
| 3,286,691 | 11/1966 | McFadden | 119/1 |
| 3,425,397 | 2/1969 | Schulein et al. | 119/1 |
| 3,675,625 | 7/1972 | Miller et al. | 119/1 |

Primary Examiner—Hugh R. Chamblee
Attorney, Agent, or Firm—Wegner, Stellman, McCord, Wiles & Wood

[57] ABSTRACT

An improved animal litter product particularly for small animals that is harmless to warm blooded animals and that includes along with the usual inert carrier vitamin E associated with the carrier with the result that the litter is odor inhibiting when contacted by odorous animal liquids and which has the additional benefit of being healthful for the animal if the deodorizing ingredient comprising the vitamin E is taken internally.

7 Claims, No Drawings

ANIMAL LITTER PRODUCT

This is a continuation of application Ser. No. 478,039 filed June 10, 1974, now abandoned.

BACKGROUND OF THE INVENTION

This invention relates to an improved litter product for warm blooded animals such as cats, chickens, and other animals and including as the active ingredient an odor inhibiting quantity of vitamin E absorbed in the particulate carrier that is inert to the vitamin E in that it does not inhibit its activity and inert to the animal in that it does not irritate the skin and is not harmful to the animal if taken internally.

Many types of animal litter products have been proposed using carriers of the type included herein but having associated with these carriers different types of active material which customarily only mask the odor with a perfume type ingredient. The litter product of this invention, in contrast, appears to destroy the odor rather than merely masking it even though the litter product does have a faint pleasant and natural fragrance which decreases as the litter is being used to absorb animal waste liquids and is actually reduced when the product is exposed to low temperatures approaching freezing such as temperatures of the order of about 38° F. In fact, at these temperatures the product tends to lose its odor inhibiting characteristic but both the fragrance and the characteristic are returned when the product is warmed to above these low temperatures.

DESCRIPTION OF THE PREFERRED EMBODIMENTS

The animal litter product of this invention comprises the usual particulate inert carrier materials in combination with an odor inhibiting quantity of vitamin E absorbed on these materials.

The carrier material may be either inorganic of the nature of clays, silicas and the like or organic in the nature of wood products and pulp and paper products. Typical carriers are well known for this type of material and include siliceous minerals such as clays of which bentonite, attapulgite, fuller's earth, diatomaceous earth, kaolin, mica, talc, sand, finely divided quartz, etc., as well as synthetically prepared siliceous materials such as silica aerogels and precipitated and fume silicas are excellent examples.

The particulate absorbent may also be organic in nature and includes particles of wood, wood fiber, paper and even shredded polymers such as polyolefins, polyurethanes and the like so long as these are inert to the vitamin E and to the animals.

Where the carrier is a inorganic material of the nature of clays as identified above, these inorganic materials may be activated by heating to increase the absorbency.

Vitamin E is also known as alpha-tocopherol or 2,5,7,8-tetramethyl-2-(4', 8', 12'-trimethyltridecyl)-6-chromanol. The vitamin may be used as such or vitamin E acetate may be used if desired. These two materials are discussed thoroughly at pages 1114 and 1115 of the Merck Index, Eighth Edition. As is pointed out there, the vitamin E is freely soluble in oils, fats, acetone, alcohol, chloroform, ether and other fat solvents of a similar nature.

The odor inhibiting quantity of vitamin E that is used in this invention may be, for example, from 0.25–5% by weight of the particulate litter material absorbent. The solvent is preferably a solvent oil that may be either a vegetable oil, preferably either corn, cottonseed, peanut or soybean, or a hydrocarbon oil such as paraffin oil. In general, however, the vegetable oils are preferred as tests have shown that the deodorizing ability of the litter product of this invention is more pronounced with a vegetable oil as the solvent oil than with a hydrocarbon oil such as paraffin oil.

The following examples illustrate the invention:

1. Fifty pounds of dried, ground clay of the size that is able to pass through a No. 6 Tyler screen but substantially retained on a No. 35 Tyler screen was placed into a concrete mixer. One half pound of cottonseed oil and one ounce of Vitamin E 500IU/g were mixed together and sprayed on the clay. Five pounds of this material was placed into a litter pan and a cat was allowed to excrete urine and feces ad libitum. The litter was checked hourly, then daily for the presence of odors. Odors began forming on the 11th day when it became obvious that the clay material was thoroughly saturated. Odors began to form immediately when the cat was allowed to excrete on untreated clay and clay treated with plant or vegetable oil but without the vitamin E.

2. Successive batches each using fifty pounds of clay, one half pound of oil, such as peanut, safflower, wheat germ, paraffin or soybean, and one ounce vitamin E were combined as in Example 1. A cat was allowed to use these litters and it was noted that no odors were detected in any of these batches for an average of 10 to 13 days with the exception of the paraffin oil batch which was 3 days.

3. Successive batches of litter were prepared by varying the carrier material. One quarter pound of cottonseed oil and one half ounce of vitamin E were mixed together and sprayed on diatomaceous earth, fullers earth and wood sawdust (25 pounds each). Odor-inhibiting preventing properties were evident. However, the carrier materials became clumped together because of the oily nature of the ingredients and the cat rejected these litters. This was also the case when silica materials and paper products were used.

4. Several batches of litter were prepared as in Example 1 and divided into 5 pound portions which were then stored in covered cardboard boxes. These portions were tested every month for one year with negligible loss of odor-inhibiting properties.

5. Batches of litter prepared as in Example 1 were used as bedding in the cages of laboratory rats and mice and guinea pigs. Two pounds of the litter was placed in each of these animal's cages and the animals were allowed to excrete ad libitum. No odors were detected for an average of six days.

Having described my invention as related to the embodiments set out herein, it is my intention that the invention be not limited be any of the details of description, unless otherwise specified, but rather be construed broadly within its spirit and scope as set out in the appended claims.

I claim:

1. An animal litter product including a particulate litter material absorbent for liquids that is harmless to warm blooded animals and which comprises an inorganic absorbent of the nature of clay and an odor inhibiting quantity of vitamin E absorbed therein in an approximate amount of about 0.25–5% by weight of the particulate litter material.

2. The product of claim 1 wherein said vitamin E is in solution in a fat solvent.

3. The product of claim 2 wherein said solvent is a solvent oil of the class consisting of vegetable and paraffin oils.

4. The product of claim 2 wherein said solvent is a vegetable oil of the class consisting of corn, cottonseed, peanut, safflower, sesame, wheat germ and soybean oils.

5. An animal litter product including a particulate litter material absorbent for liquids that is harmless to warm blooded animals and which comprises an organic absorbent of the nature of wood and pulp and paper products and an odor inhibiting quantity of vitamin E absorbed therein in an approximate amount of about 0.25–5% by weight of the particulate litter material.

6. The product of claim 5 wherein said vitamin E is in solution in a fat solvent.

7. The product of claim 6 wherein said solvent is a solvent oil of the class consisting of vegetable and paraffin oils.

* * * * *